United States Patent
Gatto

(10) Patent No.: US 6,539,898 B2
(45) Date of Patent: Apr. 1, 2003

(54) PROTECTIVE SCREEN FOR HORSE BLANKET

(75) Inventor: Alan J. Gatto, Pomona, CA (US)

(73) Assignee: Custom Made Saddlery, Inc., Pomona, CA (US)

( * ) Notice: Subject to any disclaimer, the term of this patent is extended or adjusted under 35 U.S.C. 154(b) by 0 days.

(21) Appl. No.: 10/016,145

(22) Filed: Oct. 29, 2001

(65) Prior Publication Data

US 2002/0043054 A1 Apr. 18, 2002

Related U.S. Application Data

(63) Continuation-in-part of application No. 09/386,770, filed on Aug. 31, 1999, now Pat. No. 6,318,054.

(51) Int. Cl.$^7$ .............................. A01K 13/00; B68C 5/00
(52) U.S. Cl. ...................... 119/850; 54/79.2; 54/79.3; 54/79.4
(58) Field of Search ................... 119/850, 858; D30/134, 135, 136, 137, 139, 144, 145; 54/79.1, 79.2, 79.3, 79.4, 80.1, 66; 2/455; 5/482, 486, 502; 442/243

(56) References Cited

U.S. PATENT DOCUMENTS

| | | | |
|---|---|---|---|
| 3,584,436 A | 6/1971 | Guylas ........................... 54/79 |
| 3,807,136 A | 4/1974 | Deal .............................. 54/66 |
| 4,214,421 A | 7/1980 | Battle et al. .................... 54/79 |
| 4,671,049 A | 6/1987 | Benckhuijsen ................. 54/79 |
| 4,676,946 A | 6/1987 | Feinzig et al. ............... 376/289 |
| 4,695,496 A | 9/1987 | Lee .............................. 428/95 |
| 4,742,821 A | 5/1988 | Wootan ....................... 128/134 |
| 4,864,669 A | 9/1989 | Jones ............................ 5/434 |
| 4,955,182 A | 9/1990 | Newman ....................... 54/79 |
| 5,027,456 A | 7/1991 | Wadsworth .................... 5/424 |
| 5,092,010 A | 3/1992 | Wong ............................ 5/496 |
| 5,109,559 A | 5/1992 | West ............................. 5/451 |
| 5,168,007 A | 12/1992 | Levy .......................... 428/248 |
| 5,271,211 A | 12/1993 | Newman .................... 54/79.2 |
| 5,422,462 A * | 6/1995 | Kishimoto .................. 219/529 |
| 5,473,783 A | 12/1995 | Allen ............................. 5/469 |
| 5,662,640 A | 9/1997 | Daniels ....................... 604/392 |
| 5,882,576 A | 3/1999 | Shelleby et al. .............. 266/44 |
| 5,887,299 A | 3/1999 | Phillips ......................... 5/413 |
| 6,009,693 A | 1/2000 | Hsi-Chang .................. 54/79.1 |
| 6,032,308 A | 3/2000 | Chuang ......................... 5/502 |
| 6,055,690 A | 5/2000 | Koenig ......................... 5/724 |
| 6,084,206 A * | 7/2000 | Williamson et al. ........ 219/212 |
| 6,089,194 A | 7/2000 | Labelle ...................... 119/850 |
| 6,098,219 A | 8/2000 | Milber ......................... 5/494 |

* cited by examiner

*Primary Examiner*—Yvonne Abbott
(74) *Attorney, Agent, or Firm*—Antonio R. Durando; Durando Birdwell & Janke, PLC

(57) ABSTRACT

An outer layer of mesh material is used to loosely cover the exterior of an animal blanket to provide a protective buffer against damage caused by impact and abrasion experienced during use. The mesh material utilized in the manufacture of the outer protective layer is made with a high-strength polyester yarn that has been extrusion-coated with a polyvinyl chloride sheath. This fiber material has been found to have physical characteristics that are particularly advantageous for this protective application. Specifically, in addition to the light weight, strength and flexibility provided by the inner core of the fiber, the PVC coating provides temperature stability and resistance to color fade, abrasion, flame, and mildew.

20 Claims, 4 Drawing Sheets

PROTECTIVE SCREEN FOR HORSE BLANKET

RELATED APPLICATIONS

This application is a CIP of U.S. Ser. No. 09/386,770, filed Aug. 31, 1999, now U.S. Pat. No. 6,318,054.

BACKGROUND OF THE INVENTION

1. Field of the Invention

This invention pertains to the field of protective covers for animals, such as blankets and turnout rugs for horses. In particular, it relates to a blanket that includes a protective outer screen layer made of a coated fiber particularly suited for protection and durability.

2. Description of the Related Art

Various kinds of animal blankets, such as back covers for dogs and cats and turnout rugs for horses, and water-resistant rain covers have been in use for a long time. They protect the animal from cold weather and rain in outdoor environments, often after physical activity, when the animal is overheated by exertion (such as a horse after riding). Thus, it is important that the animal be kept dry and free of accumulation of moisture and sweat under the blanket to prevent colds and other infirmities. Therefore, animal owners, especially horse owners, commonly have different blankets for different uses, depending on weather conditions, temperature, and humidity. A blanket may include insulation for warmth, a laminated layer for rain protection, or simply consist of a light permeable fabric to allow perspiration while protecting the animal. Often blankets combine some of these features in a single product.

The best modern fabrics for horse blankets are typically made with water-resistant materials that permit passage of moisture from inside out but prevent flow in the opposite direction. These materials are said to allow breathing and are therefore considered "breathable," as that term has become known in the industry. Often a permeable layer is added inside the water-resistant fabric for comfort. Other blankets utilize an impermeable non-breathable outer material, which is less expensive, and provide breathability by the addition of intermediate permeable layers and/or by structural designs that promote air flow between layers. Horse blankets that are designed for particularly cold weather typically include multiple stacked layers of quilted and impermeable fabric. For example, the first, innermost layer can be a permeable liner intended to lay on the horse's back and provide comfort. As such, cotton or other soft material is preferably used. An intermediate layer may consist of permeable insulation material, such as polyester FIBERFILL®, which is normally quilted to the liner. An outer layer of either impermeable or breathable material, such as GORETEX®, may be used to provide protection from rain. These layers are substantially of equal geometry and size, typically superimposed on each other and stitched together to form a unit.

One problem with all kinds of horse blankets is premature wear. Referring to horses, for example, because moisture, insects and debris are easily trapped under the blanket, the horses experience discomfort that causes them to rub against fence posts, corrals and the like. In the process, the outer surface of the blanket is scraped against rough surfaces, pointed structures, and similar protrusions that rapidly damage the blanket. Similar signs of discomfort are exhibited by dogs and cats. Thus, an expensive and otherwise durable blanket is turned into a worn-out cover much sooner than actual wear and tear should warrant. Once a tear occurs, unless it is immediately repaired, the blanket is rapidly transformed into a dilapidated stack of loose fabric and insulation material.

The common approach to counter this problem has been to reinforce the outer layer of the blankets by using thicker material or stronger fibers. Unfortunately, though, these solutions tend to modify the physical characteristics and performance of the blankets, such as their weight, permeability to perspiration, and water resistance. Therefore, this approach does not provide an acceptable alternative. Copending U.S. Ser. No. 09/386,770 describes a multilayer blanket with an outer protective layer made of mesh material. This invention discloses a particular mesh-material structure that is uniquely suitable for this application and provides a marked advance in the art of animal blankets.

BRIEF SUMMARY OF THE INVENTION

The primary goal of this invention is to improve the durability of a conventional horse blanket without affecting the physical characteristics of its outer layer, such that the functional performance of the blanket will remain unaffected by the added protection.

In particular, an objective of the invention is a protective layer that may withstand entanglement with a rough surface without also damaging the blanket.

Another objective is a replaceable and economic means for protecting the outer layer of a horse blanket, such that full use of the blanket can be retained by replacing the outer layer even after accidental damage is incurred as a result of entanglement with corral posts and the like.

Another goal is to provide a means for protecting the blanket without materially adding to its weight.

Another desirable objective is a protective cover suitable for use with conventional blankets of other animals for which protective blankets are normally provided, such as dogs and cats, in addition to horses.

Finally, an objective of the invention is a protective cover and an associated blanket that can be manufactured relatively inexpensively with standard materials appropriately combined to provide protection against unwarranted wear and tear while retaining the blanket's functional characteristics.

Therefore, according to one aspect of the invention, an outer layer of mesh material is used to loosely cover the exterior of an animal blanket, such as a horse blanket, to provide a protective buffer against damage caused by impact and abrasion experienced during use. The mesh material is preferably connected to the blanket by means of releasable fasteners placed only along its edges, thereby leaving the mesh material relatively free to slide over the blanket's outer sheet in case of entanglements. The mesh is selected of sufficient density to prevent contact of the blanket's surface with abutting objects; at the same time, the mesh openings must be sufficiently large to prevent impairing the blanket's aeration and to minimize the impact of its additional weight.

According to another aspect of the invention, the mesh material utilized in the manufacture of the outer protective layer is made with a high-strength polyester yarn that has been extrusion-coated with polyvinyl chloride. This fiber material has been found to have physical characteristics that are particularly advantageous for this protective application. Specifically, in addition to the light weight, strength and flexibility provided by the inner core of the fiber, the PVC coating provides temperature stability and resistance to color fade, abrasion, flame, and mildew. These properties are very useful in a material utilized as a protective layer for an animal cover or garment used outdoors.

In an embodiment of the invention first disclosed in Ser. No. 09/386,770, an all-purpose blanket for a horse includes multiple layers suitable for all weather conditions. The inner layer of the blanket consists of a soft permeable material to provide breathability and comfort. The next, intermediate layer is an insulating quilted-liner to cover the top and flanks of the animal for warmth. The next outer layer of the blanket is a waterproof material for rain protection. Finally, the mesh material of the invention provides a protective layer covering the entire blanket. All layers are independent units of substantially equal shape and size joined by common fasteners at the edges. Depending on temperature and weather requirements, only some of the blanket layers may be used.

Various other purposes and advantages of the invention will become clear from its description in the specification that follows. Therefore, to the accomplishment of the objectives described above, this invention consists of the features hereinafter illustrated in the drawings and fully described in the detailed description of the preferred embodiment and particularly pointed out in the claims. However, such drawings and description disclose only some of the various ways in which the invention may be practiced.

DESCRIPTION OF THE PREFERRED EMBODIMENTS OF THE INVENTION

The idea of this invention is the addition of a loose mesh material to the outside of an animal blanket to provide a buffer layer that protects the blanket from abrasion and entanglements while retaining the blanket's functional characteristics. The mesh material may be incorporated into the structure of a traditional blanket or provided as a protective cover releasably attached to it.

Figure 4:
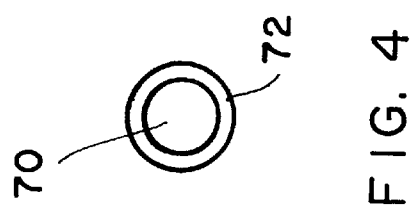
FIG. 4 is a cross-section of a coated fiber used in the mesh protective layer according to the preferred embodiment of the invention.

Since the disclosure of Ser. No. 09/386,770, a new material was discovered that is particularly suitable to practice the invention with any kind of animal cover or garment used outdoors. As illustrated in sectioned view in FIG. 4, the mesh material consists of a woven fabric manufactured with an inner fiber 70 coated with an outer sheath 72 of polyvinyl-chloride (PVC) material which provides mildew, flame and abrasion resistance properties that render it particularly attractive for use as a protective layer on an animal. In addition, PVC is stable to normal ultraviolet-light exposure and to the temperature range typically associated with outdoor usage of an animal blanket (from about 0 to about 100° F.). In a preferred embodiment of the invention, the inner fiber of the coated yarn is made of a high-strength polyester coated by extrusion with PVC. Such a woven fabric is available commercially under the mark TEXTILENE® from the Twitchell Corporation of Dothan, Ala.

Figure 1:
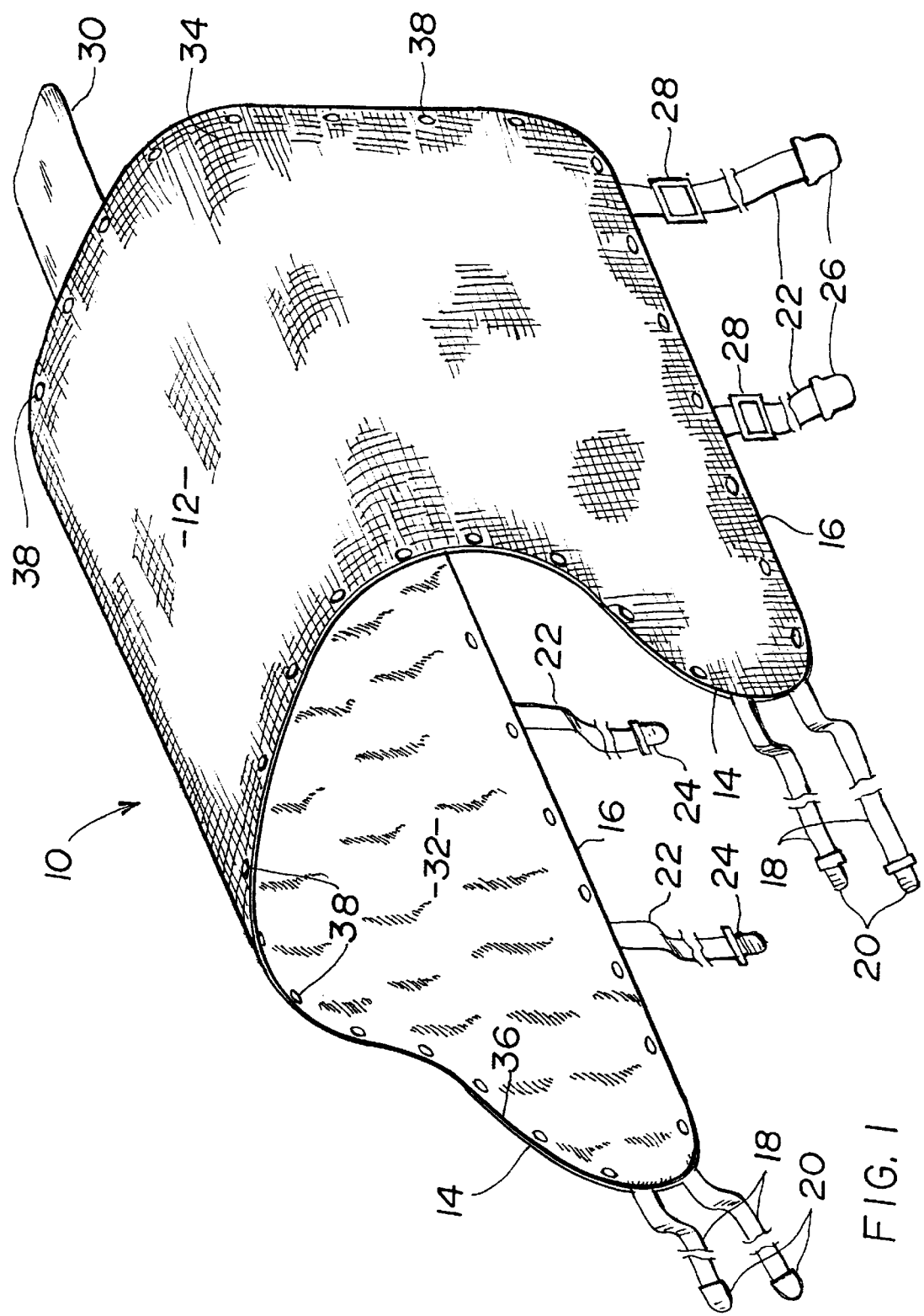
FIG. 1 is a perspective view of a horse blanket with a mesh protective cover according to the invention, shown as it would be seen laying on a horse's back.

Referring to the drawings, wherein like reference numerals correspond to like parts throughout, FIG. 1 is a perspective view of a horse blanket 10 according to the invention, seen as it would appear laid on the back of a horse (not shown). The typical structure of a horse blanket includes a top midsection 12 intended to cover the back of the horse and two front sides 14 that define a neck cutout tailored to fit around the neck of the horse wearing the blanket. The two lateral sides 16 of the midsection 12 are intended to drape over the flanks of the animal. Neck straps 18 with corresponding buckles 20 are provided to secure the front end of the blanket around the neck of the horse. Belly straps or girths 22 are similarly provided to fasten the blanket around the belly of the horse by means of mating snaps 24, 26 and tensioning means 28. A tail cover 30, adapted to extend over the tail of the horse wearing the blanket and protect it from rain, may also be included. The design criteria for the shape of the blanket, the straps and the hardware are not described in further details here because they are well known in the art.

As shown, the blanket 10 includes a single traditional inner layer 32 for direct contact with the back of a horse. This layer may consist simply of a light sheet of breathable material, or a sheet of laminated impermeable material, or it may include insulation quilted between two sheets. In any case, an outer layer 34 of mesh or net material is what characterizes the invention. More particularly, a layer 34 of mesh material made with a PVC-coated yarn, such as TEXTILENE®, constitutes the advance covered by this disclosure.

As illustrated, the mesh layer 34 is preferably attached to the inner layer 32 only along its edge 36, such as by snap fasteners 38 or equivalents thereof. Alternatively, the mesh layer 34 may be attached by a continuous stitch along the edge of the blanket. This configuration ensures that the mesh material is loosely connected to the inner layer 32 inside the perimeter of the blanket, and that it is therefore free to slide over it when caught by a post or any other structure that a horse is likely to lean or rub against.

The mesh of the net material is selected sufficiently dense to provide physical protection to the blanket layer 32; that is, the layer 34 must actually amount to a cover with sufficient structural presence to provide a buffer between the blanket and foreign objects. The density of the mesh should also be sufficient to minimize entanglements with wood splinters and small penetrating obstacles, such as nails. On the other hand, the material and the mesh density should also be judiciously chosen to minimize the weight of the protective layer 34. Nylon or polyester mesh material, 1,200 or 1,600 Denier, with about 113–160 openings per square inch, each opening about $1/32$–$1/16$ of an inch in effective diameter, has been found to be suitable for the invention. TEXTILENE® in 1,000 to 2,000 Denier with about the same ranges of opening numbers and sizes has been used very advantageously in a variety of blankets for horses and other animals.

Figure 2:
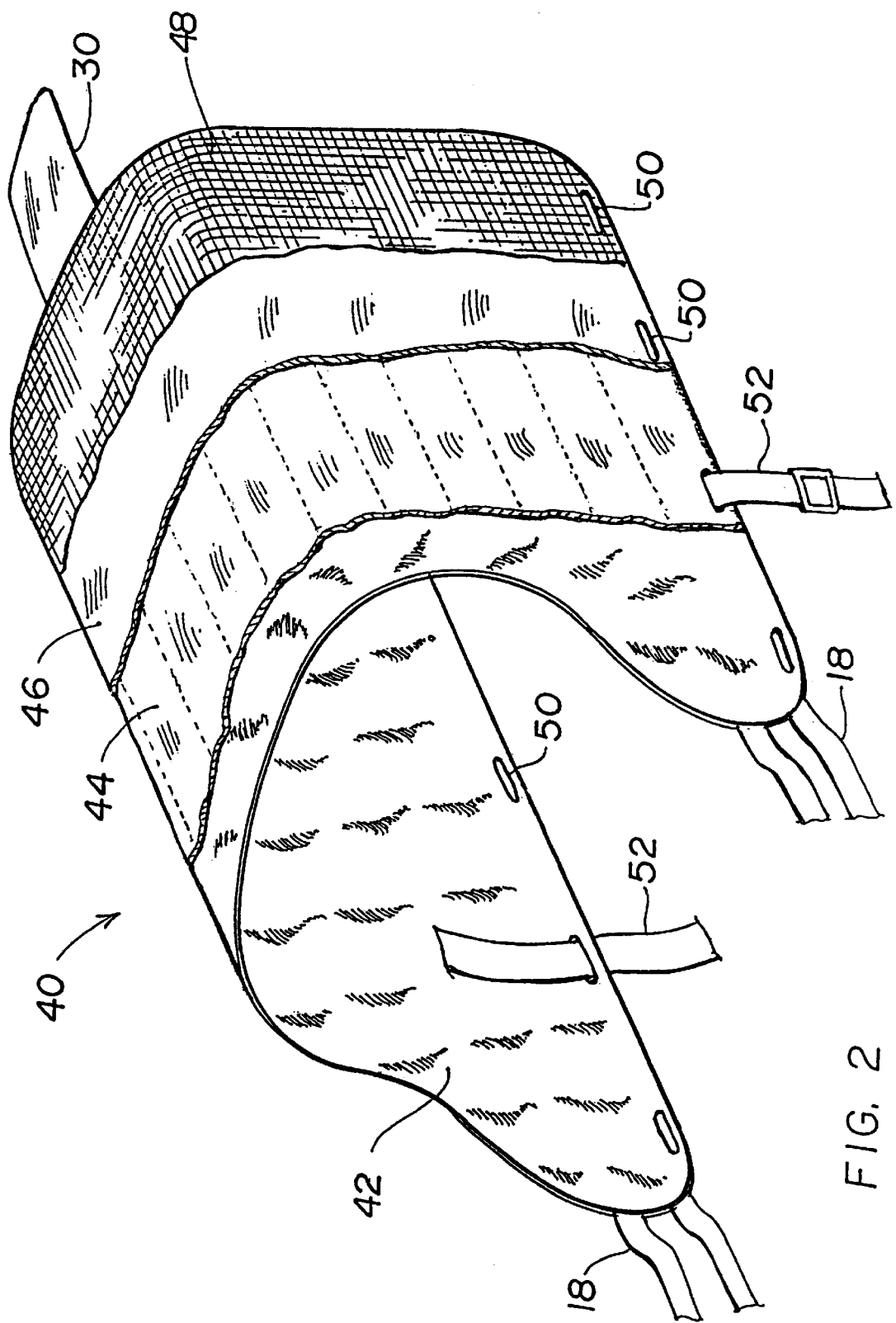
FIG. 2 is a partially cut-out perspective view of a multilayer horse blanket according to another embodiment of the invention.

In another embodiment of the invention shown in sectioned view in FIG. 2, a multilayer blanket 40 includes a combination of blanket components designed to provide the necessary units for use under any weather condition. The horse blanket 40 includes a layer 42 of absorbing, permeable material, such as cotton, usually used directly on the horse's back for comfort. Another layer 44 consists of a quilted insulated sheet to be used only in cold weather either directly on the horse or on top of the lighter layer 42. This quilted portion consists of an inner liner (not show separately in the figures) made of a material selected for comfort, such as cotton, and an outer insulating material stitched to the liner in quilt fashion to keep the horse warm in cold weather. Materials such as polyester FIBERFILL® and THINSULATE®, the latter commonly used in sleeping bags, are preferred for this application. A third layer 46 consists of a waterproof material, either laminated or breathable, to be used as an outer layer alone or in combination with one or both of the other layers, depending on the temperature and weather requirements. Materials such as GORETEX®, 1200D polyester, or other similar fabrics are suitable for this layer. Finally, an outer layer 48 of mesh material as described completes the structure of the blanket 40 according to the invention.

Each layer of the blanket 40 is separate and detached from the other layers so that it can be used independently and in any combination with any or all of the other layers. As such, the blanket 40 is convertible into a blanket most appropriate for the weather conditions at the time of use. A preferred method of connection of the various layers is through strap slits or eyelets 50 placed in all layers 42,44,46,48 in the same locations along the outer edge of each component. These eyelets can be used to firmly retain the various layers on the horse by overlapping them and passing belly straps 52 through them. As in the previous embodiment, this method of attachment ensures that the mesh layer 48 is connected to the underlying inner layer only at a few places long its edges. All component layers of the blanket 40 preferably substantially conform in shape to one another so that they can be positioned to overlap each other, with the exception perhaps of the tail cover 30 which is normally only provided in one of the layers.

The blanket 40 is intended to be utilized by including only those inner layers 42,44,44 that fit the occasion, thereby providing great flexibility of use. In all cases, the top layer 48 of mesh material is overlapped and loosely attached to the top inner layer to provide the described protective function.

Figure 3:
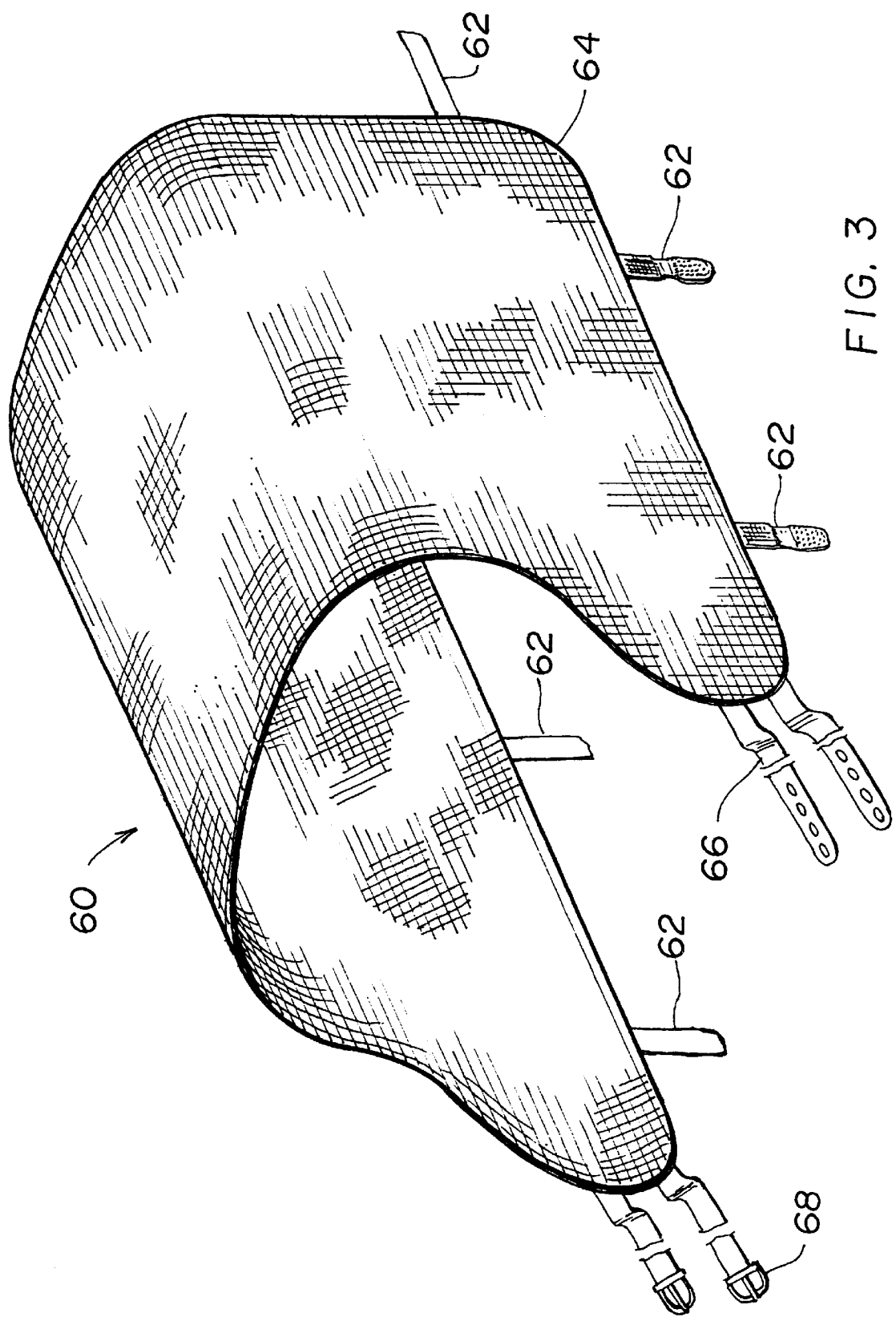
FIG. 3 is a perspective view of a mesh protective cover according to the invention for use over conventional horse blankets.

In another embodiment of the invention illustrated in FIG. 3, a protective cover 60 made substantially of mesh or net material as described is adapted for attachment to the girths 22 of a conventional horse blanket. Although manufactured as an independent component, the cover 60 is intended for use only with an existing horse blanket equipped with girth straps suitable for connection with it. Thus, the cover 60 include fasteners 62 distributed along its edge 64 for tying around rings or otherwise engaging similar receiving ends in the underlying blanket. For example, the fasteners 62 may consist of loop and hook type material that can be readily secured around such rings. Straps 66 with buckles 68 may be provided in the front side of the cover 60 to firmly secure it over the blanket. Since the only points of connection between the cover 60 and the underlying horse blanket consist of these straps and the fasteners 62, the mesh material of the cover is mostly only loosely coupled to the top surface of the blanket and is free to slide over it when it contacts a foreign object. This protects the blanket from abrasion and prevents it from getting caught and ripped by slivers, nails, or other similar protrusions extending out of obstacles likely to be met by the horse while roaming free. If the cover 60 becomes entangled by such an object, its loose connection to the blanket and the inherent forgiving nature of the net material allow it to stretch and possibly release from the snag before damage occurs either to itself or the blanket. In the worst case, the mesh of the cover 60 may tear and may eventually need to be replaced, but the surface of the more expensive blanket will be spared, which is the main object of the invention.

As disclosed, the various embodiments of the invention have proven to provide significant protection to the underlying horse blanket without affecting comfort to the horse. This is expected to result in substantial savings to horse owners who traditionally have had to replace relatively expensive horse blankets long before the material was worn out due to accidental entanglements and tears.

Figure 5:
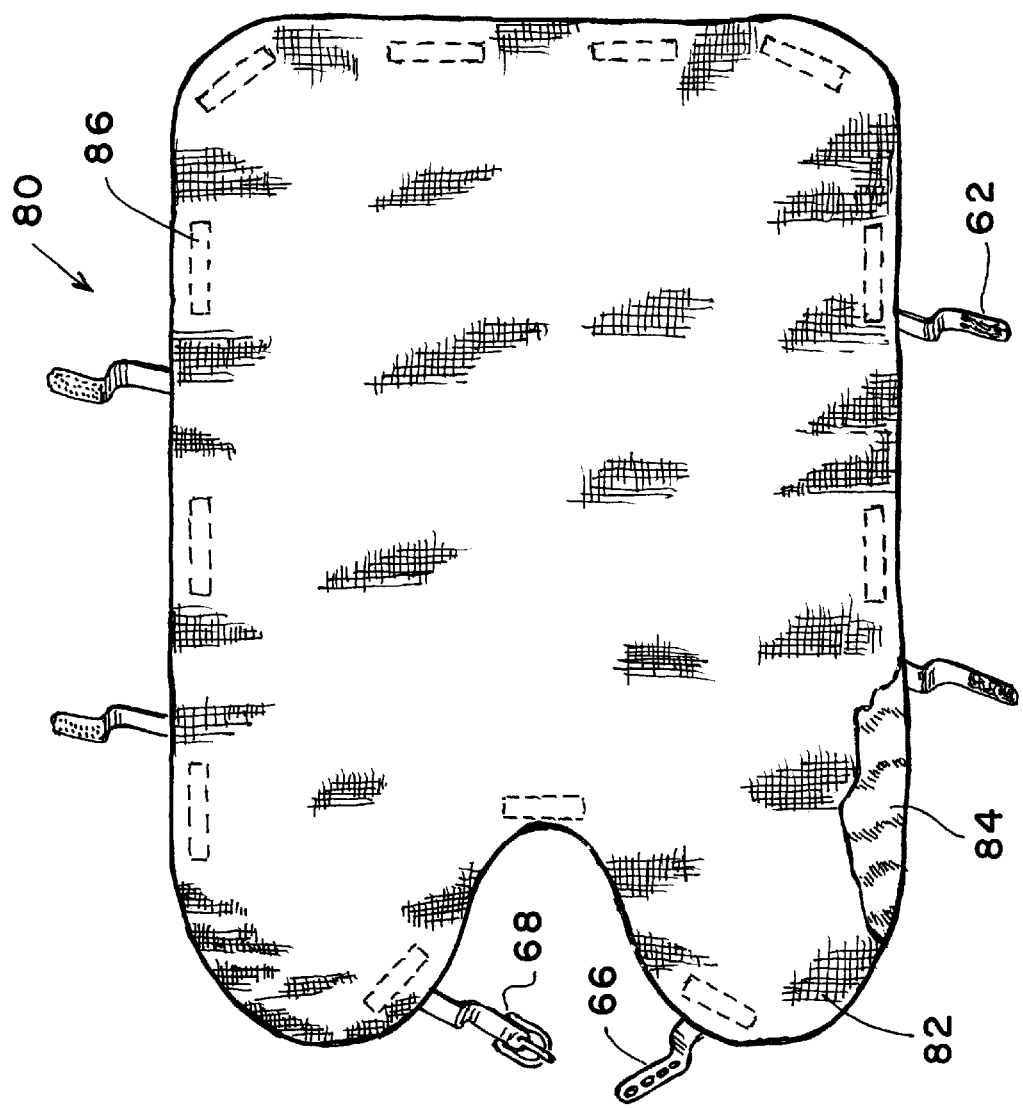
FIG. 5 is a plan view of a dog blanket including a mesh protective cover according to the invention.

The invention has been described primarily with reference to horse blankets, but the same protective layer can be used with other animal blankets and garments as well. FIG. 5 illustrates in plan view a dog blanket 80 according to the invention. The blanket 80 is essentially the same as the horse blanket 60 of FIG. 3, but proportionately smaller in size to fit different dogs. A top mesh layer 82 is attached to the underlying blanket 84 by means of VELCRO® strips 86 positioned around the edges of the blanket. Thus, the protective layer 82 may be removed from the blanket, if so desired. Conventional fasteners 62, straps 66 and buckles 68 are also preferably provided to retain the blanket over the dog. As in the case of horse blankets, an important feature of the invention is the loose connection between the protective mesh layer and the underlying blanket, which permits the two to move relatively freely independent of one another, thereby minimizing damage in case of entanglement of the protective layer with an exterior obstacle. Another important feature is the use of the particular PVC-coated type of fiber described above, which provides improved properties over conventional nylon or polyester mesh material.

Various changes in the details, materials and components that have been described may be made by those skilled in the art within the principles and scope of the invention herein illustrated. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope embraced by any and all equivalent processes and products.

I claim:

1. A protective cover for an animal blanket comprising:
   a layer of mesh material substantially conforming to the size of the animal blanket; and
   means for fastening said layer of mesh material to the animal blanket;
   wherein said mesh material is constructed with a yarn made of an inner fiber coated with polyvinyl chloride.

2. The animal blanket of claim 1, wherein said inner fiber is made of polyester material.

3. The animal blanket of claim 1, wherein said means for fastening comprises loop and hook fasteners adapted to engage the animal blanket.

4. The horse blanket of claim 1, wherein said means for fastening comprises releasable snap fasteners.

5. The animal blanket of claim 1, wherein said mesh material consists of a net with about 113–160 openings per square inch.

6. The animal blanket of claim 1, wherein said animal is a horse.

7. The animal blanket of claim 1, wherein said inner fiber is made of polyester material, said means for fastening comprises loop and hook fasteners adapted to engage the animal blanket, and said mesh material consists of a net with about 113–160 openings per square inch.

8. A horse blanket comprising:

an inner layer adapted for covering a horse; and an outer layer of mesh material covering and loosely connected to said inner layer;

wherein said mesh material is constructed with a yarn made of an inner fiber coated with polyvinyl chloride.

9. The horse blanket of claim 8, wherein said outer and inner layers are attached through releasable snap fasteners.

10. The horse blanket of claim 8, wherein said mesh material consists of a net with about 113–160 openings per square inch.

11. The horse blanket of claim 8, wherein said outer layer of mesh material conforms to the geometry of said inner layer.

12. The horse blanket of claim 8, wherein said inner fiber is made of polyester material.

13. The horse blanket of claim 8, wherein said outer and inner layers are attached through releasable snap fasteners, said mesh material consists of a net with about 113–160 openings per square inch, said outer layer of mesh material conforms to the geometry of said inner layer, and said inner fiber is made of polyester material.

14. A convertible multilayer horse blanket comprising:

a first inner layer of permeable material;

a second inner layer of insulating material;

a third inner layer of impermeable material;

a fourth, outer layer of mesh material; and means for fastening the various layers to one another in overlapping disposition;

wherein at least one of the three inner layers is used in combination with the outer layer at any given time; and wherein said mesh material is constructed with a yarn made of an inner fiber coated with polyvinyl chloride.

15. The horse blanket of claim 14, wherein said outer layer is partially attached to an edge of an inner layer.

16. The horse blanket of claim 14, wherein said outer and inner layers are attached by straps passed through overlapping eyelets in each layer.

17. The horse blanket of claim 14, wherein said mesh material consists of a net with about 113–160 openings per square inch.

18. The horse blanket of claim 14, wherein said outer layer of mesh material conforms to the geometry said inner layer.

19. The horse blanket of claim 14, wherein said inner fiber is made of polyester material.

20. The horse blanket of claim 14, wherein said outer layer is partially attached to an edge of an inner layer, said outer and inner layers are attached by straps passed through overlapping eyelets in each layer, said mesh material consists of a net with about 113–160 openings per square inch, said outer layer of mesh material conforms to the geometry said inner layer, and said inner fiber is made of polyester material.

* * * * *